United States Patent
Yamamoto et al.

(10) Patent No.: US 6,780,344 B2
(45) Date of Patent: Aug. 24, 2004

(54) GARNET FERRITE FOR LOW-INSERTION-LOSS NON-RECIPROCAL CIRCUIT, METHOD FOR PREPARING THE SAME, AND NON-RECIPROCAL CIRCUIT DEVICE INCLUDING THE SAME

(75) Inventors: Yutaka Yamamoto, Niigata-ken (JP); Tomoo Kato, Niigata-ken (JP); Toshio Takahashi, Niigata-ken (JP); Hitoshi Onishi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/278,311

(22) Filed: Oct. 23, 2002

(65) Prior Publication Data
US 2003/0080315 A1 May 1, 2003

(30) Foreign Application Priority Data
Oct. 24, 2001 (JP) .......................... 2001-326611

(51) Int. Cl.$^7$ ................................ H01F 1/34
(52) U.S. Cl. ..................... 252/62.57; 333/1.1; 333/24.2
(58) Field of Search ..................... 252/62.57; 423/594.1, 423/263; 501/152, 126; 117/945; 333/1.1, 242

(56) References Cited

U.S. PATENT DOCUMENTS

| | | | | |
|---|---|---|---|---|
| 3,479,292 A | * | 11/1969 | Chegwidden et al. | .... 252/62.57 |
| 5,055,214 A | * | 10/1991 | Kounoike et al. | ....... 252/62.57 |
| 5,709,811 A | * | 1/1998 | Satoh et al. | ............. 252/62.57 |
| 2003/0006394 A1 | * | 1/2003 | Fujita et al. | ............... 252/62.6 |

FOREIGN PATENT DOCUMENTS

JP  4-114411  4/1992

* cited by examiner

*Primary Examiner*—C. Melissa Koslow
(74) *Attorney, Agent, or Firm*—Brinks Hofer Gilson & Lione

(57) ABSTRACT

A garnet ferrite used for a non-reciprocal circuit device contains Fe in an amount lower than the value derived from stoichiometry by 0.5% to 5%, and more preferably by 1% to 3%. The garnet ferrite can exhibit a low insertion loss in a high-frequency band of more than 5 MHz.

7 Claims, 2 Drawing Sheets

GARNET FERRITE FOR LOW-INSERTION-LOSS NON-RECIPROCAL CIRCUIT, METHOD FOR PREPARING THE SAME, AND NON-RECIPROCAL CIRCUIT DEVICE INCLUDING THE SAME

BACKGROUND OF THE INVENTION

1. Field of the Invention

The present invention relates to a garnet ferrite for non-reciprocal circuit devices used in high-frequency bands such as the microwave band, a non-reciprocal circuit device including the same, and a method for preparing the same. In particular, the present invention relates to a technique for reducing the insertion loss in high-frequency bands.

2. Description of the Related Art

Mn—Zn ferrites, Ni—Zn ferrites, lithium ferrites, YIG ferrites, and the like have been used as magnetic materials for high frequencies.

Also, in radio communication apparatuses, such as cellular phones, non-reciprocal circuit devices using such a high-frequency magnetic material are provided between an antenna and an amplifier in order to stabilize the operation of the amplifier and to prevent cross modulation.

In those magnetic materials, a YIG ferrite in which part of the composition $Y_3Fe_5O_{12}$ is replaced with Gd or Al has been put into practical use, and is well known as a material capable of exhibiting a low insertion loss and excellent saturation magnetization. Supposedly, the saturation magnetization 4 $\pi$Ms and the temperature coefficient (a) of the saturation magnetization 4 $\pi$Ms can be varied by controlling the substituted Gd or Al contents, and therefore, the YIG ferrite can exhibit various 4 $\pi$Ms values suitable to the frequency. In addition, when the ferrite is used in combination with a permanent magnet, it can advantageously compensate for the temperature characteristics of the magnet. Thus, the YIG ferrite is described as a material capable of being applied to stable non-reciprocal circuit devices, such as isolators and circulators.

The inventors have conducted research for use of the YIG ferrite as a non-reciprocal circuit device used in high-frequency bands of 500 MHz or more, and particularly on materials to reduce insertion loss, and have consequently achieved the present invention.

The YIG ferrite is generally prepared by calcining a raw mixture containing yttrium (Y) oxide powder, iron (Fe) oxide powder, and gadolinium (Gd) oxide power which have been weighed so as to form a desired composition, followed by pulverizing with a pulverizer, such as a ball mill or an attritor, and compacting the pulverized material into a desired shape. Finally, the material is fired and, thus, a non-reciprocal circuit device is completed.

Based on this method, the inventors have conducted research on the YIG ferrite. As a result, the inventors have found that it is difficult, using the YIG ferrite, to produce a non-reciprocal circuit device having the desired high-frequency characteristics, even if the YIG ferrite is prepared by weighing the powder materials so as to form a desired composition. According to this finding, the inventors reviewed the processes of this method, and found that, if the internal wall, pulverizing blade, or balls of the pulverizer contain elemental Fe, part of the Fe moves into the calcined material during pulverizing and mixing of the calcined material, and consequently, the resulting composition of the YIG ferrite cannot satisfy the stoichiometric requirements. This is likely to degrade the high-frequency characteristics.

SUMMARY OF THE INVENTION

Accordingly, an object of the present invention is to provide a garnet ferrite capable of realizing a low insertion loss in a high-frequency band of more than 500 MHz.

Another object of the present invention is to provide a garnet ferrite capable of realizing a low insertion loss in a high-frequency band of more than 500 MHz and which has a ferromagnetic resonance with a small half-width.

Still another object of the present invention is to provide a method for preparing a garnet ferrite having a desired composition with reliability.

According to an aspect of the present invention, a garnet ferrite used for a non-reciprocal circuit is provided. The garnet ferrite contains Fe in an amount 0.5% to 5% lower than the value derived from stoichiometry.

By reducing the Fe content to a value lower than the stoichiometric value, the resulting garnet ferrite will be non-stoichiometric and can exhibit a low insertion loss in a high-frequency band of more than 500 MHz.

Preferably, the Fe content is 1% to 3% lower than the value derived from stoichiometry.

By setting the Fe content 1% to 3% lower than the stoichiometric value, the resulting garnet ferrite can exhibit a low insertion loss in a high-frequency band of more than 500 MHz and an excellent ferromagnetic resonance half-width. An excessively reduced Fe content disadvantageously increases the ferromagnetic resonance half-width.

Preferably, the composition of the garnet ferrite is expressed by the formula $A_3B_5O_{12}$, wherein A represents Y or Y and Gd, and B represents Fe or Fe and at least one element selected from the group consisting of Al, In, and Mn.

Thus, an excellent garnet ferrite containing YFeO, Gd substituted for part of the Y of the YFeO, or Al, In, or Mn substituted for part of the Fe of the YFeO can be provided. The garnet ferrite can exhibit a low insertion loss in a high-frequency band of more than 500 MHz and an excellent ferromagnetic resonance half-width.

The composition may be expressed by the formula $Y_xGd_{3-x}Al_{0.5}Fe_{4.5}O_{12}$, wherein X is 0 or more and less than 3.

Preferably, the composition is expressed by the formula $Y_3Fe_{5-5y}Al_{5y}O_{12}$.

This composition ensures a garnet ferrite capable of exhibiting a low insertion loss and a small ferromagnetic resonance half-width.

In addition, part of the Fe may be replaced with Mn in an amount equivalent to 0.1% by weight or less of MnO.

Mn is added to prevent oxidation, and it contributes to the reduction of the ferromagnetic resonance half width. However, an excessive Mn content increases the ferromagnetic resonance half-width.

According to another aspect of the present invention, a method for preparing a garnet ferrite used for a non-reciprocal circuit device, the garnet ferrite containing Fe in an amount 0.5% to 5% lower than the value derived from stoichiometry. The method comprises the steps of: mixing raw materials having a desired composition; calcining the raw materials to form a calcined material; pulverizing and mixing the calcined material; and subjecting the calcined material to forming and firing. The step of mixing the raw materials and the step of pulverizing and mixing the calcined material are performed using a pulverizer whose portion coming into contact with the raw materials or the calcined material does not contain Fe.

Thus, only the Fe content of the garnet ferrite is reduced to a value lower than the value derived from stoichiometry. The resulting garnet ferrite can exhibit a low insertion loss and a small ferromagnetic resonance half-width.

The pulverizer may be a ball mill or a planetary mill whose portion coming into contact with the raw materials does not contain Fe.

If the internal wall or balls of the ball mill are formed of an Fe alloy, part of the Fe is likely to move into the material mixture while the material mixture is in contact with the balls or the internal wall, in the pulverizing and misting step. The same goes for the planetary mill, and part of the Fe contained in the blade is likely to move into the material mixture while the blade is in contact with the material mixture. By using balls formed of alumina, zirconia, or the like and a metal core formed of calcium titanate or the like, the migration of Fe can be prevented.

According to another aspect of the present invention, a non-reciprocal circuit device is provided. The non-reciprocal circuit device includes a magnetic assembly, a magnet for applying a direct current magnetic field to the magnetic assembly, a matching capacitor, and a yoke for joining the magnetic assembly, the magnet, and the matching capacitor. The magnetic assembly includes a main body having a garnet ferrite containing Fe in an amount 0.5% to 5% lower than the value derived from stoichiometry and a plurality of center conductors disposed on the upper surface of the main body. The center conductors intersect each other at a predetermined angle with electrical insulation.

The non-reciprocal circuit device can exhibit a low insertion loss in a high-frequency band of more than 500 MHz.

DESCRIPTION OF THE PREFERRED EMBODIMENTS

The present invention will be further illustrated with reference to the drawings.

Figure 1:
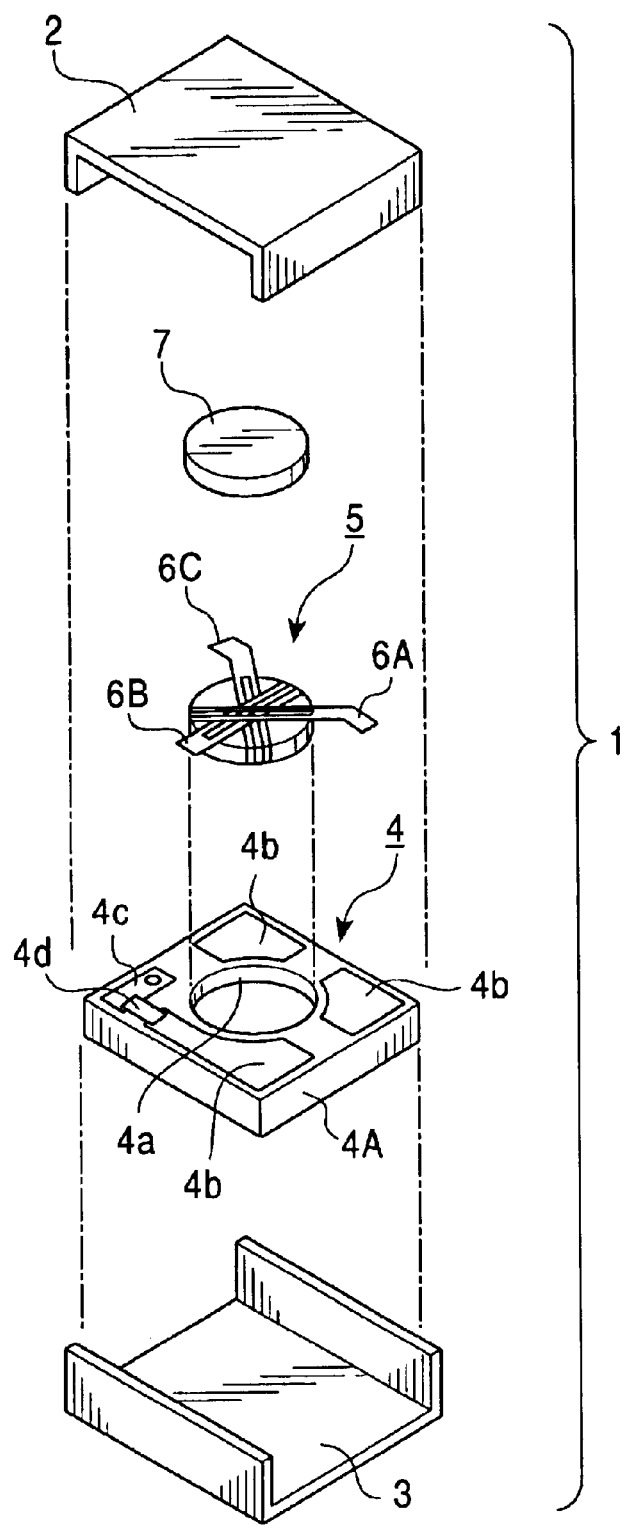
FIG. 1 is an exploded perspective view of a non-reciprocal circuit device having a garnet ferrite of the present invention.

FIG. 1 is an exploded perspective view of an isolator (non-reciprocal circuit device) including a garnet ferrite of the present invention. This isolator 1 includes a lower case 3, a substrate 4, a circular garnet ferrite element 5, center conductors 6A, 6B, and 6C electrically connected to each other with a common electrode portion under the garnet ferrite element 5, a magnet 7, and an upper case 2, in that order from the lower case side.

The upper and lower cases 2 and 3 are formed of a magnetic material and have a substantially U-shape in side view. They are combined with each other to serve as a box container. The substrate 4 includes a resin base 4A having a circular opening 4a at the center thereof. Patterned electrodes 4b are disposed at three corners on a surface of the substrate, and a grounding electrode 4c is disposed at the other corner. Also, a resistor element 4d is electrically connected to one of the patterned electrodes 4b and the grounding electrode 4c. If the resistor element 4d is not present, the non-reciprocal circuit device serves as a circulator.

The garnet ferrite element 5 is formed of a garnet ferrite in a circular shape. The center conductors 6A, 6B, and 6C, which are formed of a metal in a strap, are disposed around the surfaces of the garnet ferrite element 5 from the center at an angle of 60° with respect to each other. The garnet ferrite element 5 is fit into the opening 4a. One end of the center conductors 6A, 6B, and 6C are electrically connected to the respective patterned electrodes 4b and the other ends are connected together to the common electrode portion not shown in the drawing. The circular magnet 7 for applying a bias magnetic field to the garnet ferrite in the vertical direction is disposed on the center conductors 6A, 6B, and 6C. These assembled parts are held between the upper case 2 and the lower case 3, and thus the isolator 1 is structured.

The garnet ferrite element 5 is formed of a garnet ferrite not having the well-known stoichiometric composition $Y_3Fe_5O_{12}$, but a composition different in only the Fe content. The Fe content of the garnet ferrite of the present invention is 0.5% to 5% lower than the value derived from stoichiometry. Preferably, the Fe content is lower than the stoichiometric value by 1% to 3%, and more preferably by 1.5% to 2.5%.

Garnet ferrites are preferably expressed by the formula $A_3B_5O_{12}$, wherein A represents Y or Y and Gd, and B represents Fe or Fe and at least one element selected from Al, In, and Mn. Accordingly, the garnet ferrite of the present invention is expressed by the formula $A_3Fe_{5-y}(Al, In)_yMn_zO_{12}$. y is in the range of 0.5% to 5% relative to the value derived from the stoichiometric composition, and preferably in the range of 1.5% to 2.5%. Z represents the composition ratio of Mn, and the Mn content is equivalent to 0.1% by weight or less of MnO.

If Gd is contained in the composition, the garnet ferrite is expressed by the formula $Y_xGd_{3-x}Al_{0.5}Fe_{4.5}O_{12}$, wherein x is 0 or more, and less than 3.

More preferably, the composition is expressed by the formula $Y_3Fe_{5-5y}Al_{5y}O_{12}$.

A method for preparing the garnet ferrite element 5 will now be described and prepared as follows: First, a ratio of Fe to B in a predetermined stoichiometric garnet ferrite composition $A_3(Fe, B)_5O_{12}$ where the stoichiometric (Fe,B) ratio is 5 is determined. Then the stoichiometric value of just the Fe content is multiplied by a value in the range of 0.95 to 0.995. This is the value of Fe in the final non-stoichiometric compound, resulting in a reduction of the Fe content by 0.5% to 5%.

The amount of the constituent powdered materials to make up the final composition are determined and then processed into the resulting garnet ferrite. First, the oxide powders containing elements constituting a target composition are weighed and mixed so as to have the target composition.

For example, raw materials for preparing a Y—Fe—Al—O ferrite are $Y_2O_3$, $Fe_2O_3$, and $Al_2O_3$ powders, and raw materials for a Y—Gd—Fe—Al—Mn—O ferrite are $Y_2O_3$, $Gd_2O_3$, $Fe_2O_3$, $MnO_2$, and $Al_2O_3$ powders.

The target composition here contains Fe in an amount lower than the value derived from the composition $A_3B_5O_{12}$ by the degree described above.

It is preferable to use powders as the raw materials. The raw material powders are weighed so as to form the target composition. If the raw materials are not powdery but granular or solid, they are mixed to form a material mixture, and then further pulverized and mixed with a pulverizer, such as a ball mill or an attritor, for a necessary period of time, for example, for several minutes to tens of minutes. In this pulverizing and misting step, if the internal wall, pulverizing blade, or balls of the pulverizer contains Fe, part of the Fe is likely to move into the material mixture. It is therefore preferable that the portion of the pulverizer coming into contact with the material mixture does not contain Fe.

If a ball mill is used as the pulverizer, the blade and the vessel of the ball mill for placing the material mixture are formed of a material not containing Fe. If an attritor is used, the balls of the attritor for pulverizing and mixing the material mixture may be formed of alumina, zirconia, or the like, and the metallic core may be coated with calcium titanate. Thus, the migration of Fe from the pulverizer to the material mixture is prevented. The internal walls of the ball mill and the attritor are formed of a material not containing Fe, and, for example, a resin such as nylon.

Specifically, for example, zirconia balls and the material mixture are placed in a cylindrical vessel of a ball mill, having a diameter of 180 mm (inner diameter of 135 mm) formed of a resin, such as nylon. The vessel is covered with a lid formed of the same resin, and is put on a stand including two horizontal rotation bars which are separately held at a distance slightly smaller than the diameter of the cylindrical vessel. The vessel is rotated at a rotation speed of 80 to 100 rpm for 16 to 20 hours by rotating the bars. By this rotation of the vessel, the zirconia ball and the material mixture are agitated, and thus the material mixture is pulverized.

If the raw materials are powder, this pulverizing and mixing step may be skipped.

After being dried, the raw material mixture is calcined at a temperature of 1000 to 1200° C. in an atmosphere of air or oxygen for a necessary period of time, for example, for several hours, thus resulting in a calcined powder (calcined material).

Subsequently, the calcined powder is further powdered with a pulverizer such as a ball mill or the attritor. Preferably, this pulverizer also satisfies the above-described requirement for the pulverizer, in order to prevent the migration of Fe.

After-establishing a uniform size of the calcined powder, the powder is formed into a desired shape, such as a disk, a plate, or a prism, in the presence of a binder at a pressure of about 1 t/cm². Then, the resulting compact is fired at a temperature of about 1350 to 1500° C. At this point, the compact may have a shape slightly different from the desired shape, and, after firing, it may be cut into a desired shape.

The resulting garnet ferrite element 5 is provided with the center conductors 6A, 6B, and 6C, as shown in FIG. 1, and is fit into the opening 4a of the substrate 4, as shown in FIG. 1. Then, the garnet ferrite element 5 is placed between the cases 1 and 2 together with the magnet 7. Thus, the isolator 1 is completed.

Since the Fe content of the garnet ferrite element 5 is lower than the stoichiometric value, the resulting isolator 1 has the garnet ferrite serving as a microwave ferrite capable of exhibiting excellent magnetic properties. Specifically, the isolator 1 can have a small ferromagnetic resonance half-width ΔH and a low insertion loss.

The ferromagnetic resonance half-width ΔH of the garnet ferrite element 5 refers to the half-width of the imaginary part μ" of magnetic permeability. In general, a magnetic permeability of a general magnetic material is measured according to the direction in which a magnetic field has been applied. On the other hand, the magnetic permeability of the garnet ferrite element 5 is measured by applying a high-frequency magnetic field in the direction perpendicular to the direction of a static magnetic field in saturation. Thus, the ferromagnetic resonance half-width ΔH is determined from the imaginary part of a measured magnetic permeability. The smaller the ferromagnetic resonance half-width ΔH is, the lower the insertion loss is.

If the Fe content is excessively reduced, that is, if the Fe content is reduced to an amount 5% or more lower than the value derived from the stoichiometric composition, the ΔH value increases obviously. When the Fe content becomes 3% lower than the stoichiometric value, the ΔH value starts increasing disadvantageously. From the viewpoint of the ΔH value, the reduction of the Fe content is, preferably, within 2.5% to the stoichiometric value. However, an amount of reduction lower than 0.5% does not have the effect of advantageously reducing the ΔH value.

As described above, the garnet ferrite element 5 can achieve an isolator exhibiting a low insertion loss in a high frequency band of 500 MHz or more, for example, a frequency band of 10 GHz, and exhibiting a small ΔH. Therefore, by disposing the isolator 1 having the garnet ferrite element 5 between an amplifier and an antenna, the isolator 1 can excellently serve as a two-terminal device of a transmitter for preventing noise from entering the amplifier from the antenna.

Also, by controlling the Fe content, the 4 πMs value can be controlled to be set suitable to a high frequency band. Therefore, when the garnet ferrite element 5 is used for the isolator 1 in combination with the permanent magnet 7, it can compensate for the temperature characteristics of the magnet 7.

EXAMPLES $Y_2O_3$ powder, $Fe_2O_3$ powder, and $Al_2O_3$ powder were compounded so as to form the compositions of Sample Nos.

1 to 27 shown in Table 1. The powder materials were mixed with a ball mill (using hard balls coated with ceramic). After being dried, the material mixture was calcined at 1200° C. for 2 hours, thus resulting in a calcined material. Next, the calcined material and an organic binder were placed in the ball mill, and were subsequently wet-pulverized for 20 hours. The pulverized material were fired in an atmosphere of air or oxygen at a temperature in the range of 1400 to 1500° C., as shown in table 1, thus resulting in samples of the garnet ferrite.

static magnetic field to produce magnetic saturation. The ΔH value refers to the half-width of the imaginary part $\mu''$ of the measured magnetic permeability.

Table 1 shows that Sample No. 27, whose difference from the stoichiometric composition is 3.24%, exhibits sufficiently large 4 πMs and low insertion loss though the ΔH value starts increasing. Therefore, even if the difference in the Fe content from the stoichiometric composition is about 3%, the reduction of the Fe content is effective. If the difference from the stoichiometric composition is 3% or less,

TABLE 1

| Sample No. | Sintering temperature (° C.) | Fe content (%) | 4πMs (× 10⁻⁴ T) | ΔH (10 GHz) (KA/m) | Insertion loss (dB) | y | Reference Fe content | Difference from stoichiometric (%) | Mn content on MnO basis (wt %) |
|---|---|---|---|---|---|---|---|---|---|
| 1 | 1450 | 4.17 | 686 | 3.56 | 0.43 | 0.166 | 4.17 | 0.00 | — |
| 2 | 1450 | 4.17 | | 3.75 | | 0.166 | 4.17 | 0.00 | Mn: 0.1 |
| 3 | 1400 | 4.402 | | 2.79 | | 0.108 | 4.46 | −1.30 | — |
| 4 | 1450 | 4.402 | | 3.45 | | 0.108 | 4.46 | −1.30 | — |
| 5 | 1500 | 4.402 | | 3.25 | | 0.108 | 4.46 | −1.30 | — |
| 6 | 1400 | 4.105 | 665 | 2.53 | 0.378 | 0.166 | 4.17 | −1.56 | — |
| 7 | 1450 | 4.105 | 648 | 2.87 | 0.363 | 0.166 | 4.17 | −1.56 | — |
| 8 | 1400 | 3.951 | | 2.81 | | 0.197 | 4.015 | −1.59 | — |
| 9 | 1450 | 3.951 | | 2.26 | | 0.197 | 4.015 | −1.59 | — |
| 10 | 1500 | 3.951 | | 2.88 | | 0.197 | 4.015 | −1.59 | — |
| 11 | 1450 | 4.389 | | 2.73 | | 0.18 | 4.46 | −1.59 | — |
| 12 | 1450 | 4.595 | | 3.33 | | 0.066 | 4.67 | −1.61 | — |
| 13 | 1450 | 4.380 | | 2.74 | | 0.108 | 4.46 | −1.79 | — |
| 14 | 1450 | 3.935 | | 2.51 | | 0.197 | 4.015 | −1.99 | — |
| 15 | 1500 | 3.935 | | 2.55 | | 0.197 | 4.015 | −1.99 | — |
| 16 | 1400 | 4.577 | | 3.36 | | 0.066 | 4.67 | −1.99 | — |
| 17 | 1450 | 4.577 | 1389 | 2.9 | 0.505 | 0.066 | 4.67 | −1.99 | — |
| 18 | 1450 | 4.37 | 1108 | 2.44 | 0.438 | 0.108 | 4.46 | −2.02 | — |
| 19 | 1500 | 4.37 | | 3.39 | | 0.108 | 4.46 | −2.02 | — |
| 20 | 1450 | 4.085 | 681 | 3.24 | 0.375 | 0.166 | 4.17 | −2.04 | — |
| 21 | 1450 | 4.085 | | 2.51 | | 0.166 | 4.17 | −2.04 | Mn: 0.1 |
| 22 | 1500 | 4.357 | | 6.31 | | 0.166 | 4.17 | −2.04 | Mn: 0.7 |
| 23 | 1450 | 4.357 | | 2.59 | | 0.108 | 4.46 | −2.31 | — |
| 24 | 1500 | 4.357 | | 3.34 | | 0.108 | 4.46 | −2.31 | — |
| 25 | 1500 | 3.915 | | 2.33 | | 0.197 | 4.015 | −2.49 | — |
| 26 | 1450 | 4.553 | | 2.23 | | 0.066 | 4.67 | −2.51 | — |
| 27 | 1450 | 4.035 | 698 | 5.81 | 0.447 | 0.166 | 4.17 | −3.24 | — |

Basic composition: $Y_3Fe_{5-5y}Al_{5y}O_{12}$ (0.066 ≤ y ≤ 0.197)

The firing temperature shown in Table 1 represents sintering temperature. The Fe content (%) represents the Fe content of the resulting garnet ferrite samples. The ΔH value represents the ferromagnetic resonance half-width (the imaginary part $\mu''$ in the term of loss) of the garnet ferrite samples. y represents a value corresponding to the amount of Al substituted for Fe in the composition expressed by the basic formula $Y_3Fe_{5-5y}Al_{5y}O_{12}$. The reference Fe content represents the stoichiometric Fe content. The difference from the stoichiometric composition represents a value derived from the formula:

{(reference Fe content−actual Fe content)/reference Fe content}× 100 (%)

For example, the difference from the stoichiometric composition in Sample No. 20 is:

{(4.17−4.085)/4.17}×100=0.0204×100=2.04%

The magnetic permeability of the garnet ferrite samples was measured by applying a high-frequency magnetic field in the direction perpendicular to the direction of a static magnetic field while a bias magnetic field is applied to the an excellent 4 πMs, a small ΔH, and a low insertion loss can be obtained. Hence, a difference from the stoichiometric composition of 3% or less is preferable.

According to the comparison of Sample Nos. 2, 20, and 21, which contain Mn, a Mn content equivalent to 0.1% by weight of MnO results in adequate characteristics, but a Mn content equivalent to 0.7% by weight MnO increases the ΔH value. A Mn content of 0.1% by weight is therefore sufficient.

Figure 2:
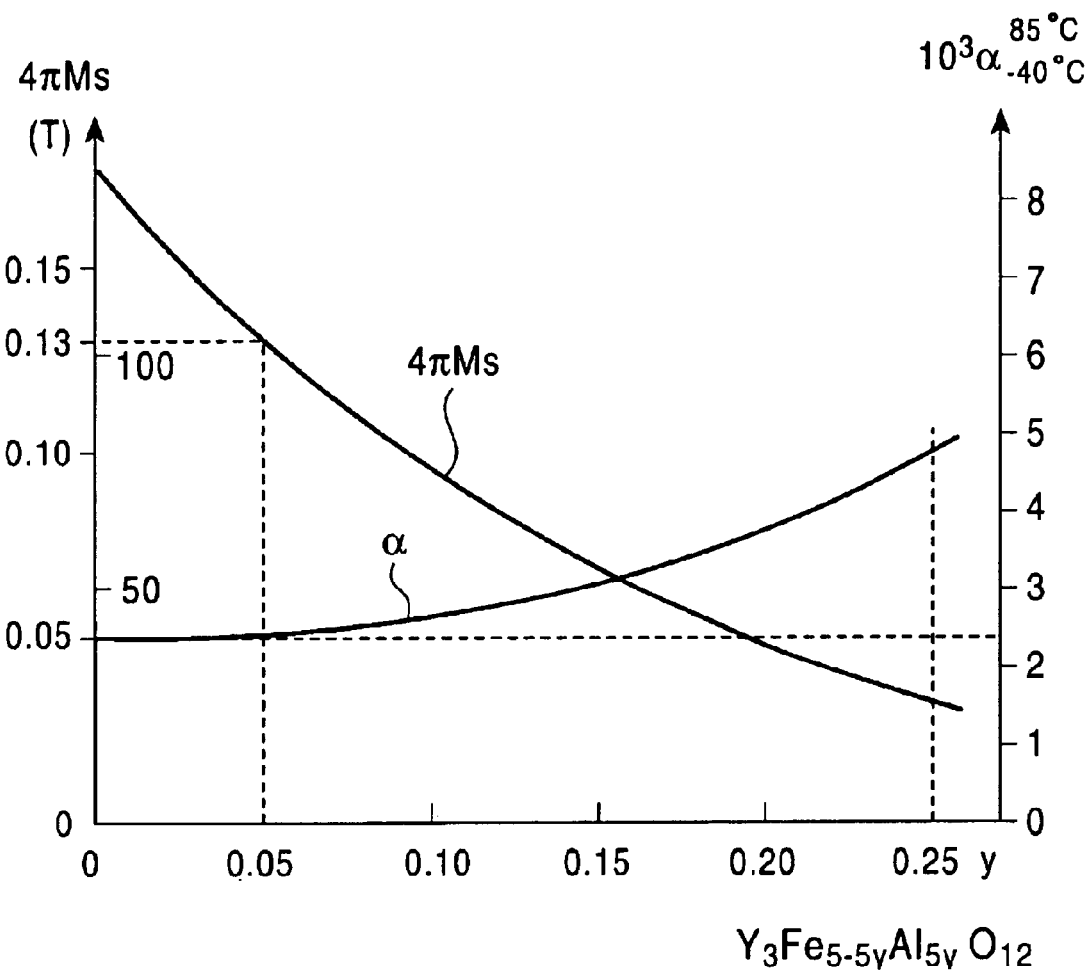
FIG. 2 is a graph showing magnetic characteristics depending on the composition of a garnet ferrite of the present invention.

FIG. 2 shows the dependence of the 4 πMs value of the garnet ferrite having the composition $Y_3Fe_{5-5y}Al_{5y}O_{12}$ on the Al content.

In order to increase the 4 πEMs value of the garnet ferrite having the composition $Y_3Fe_{5-5y}Al_{5y}O_{12}$, preferably, y is set at 0.25 or less. Since the 4 πMs value needs to be in the range of about 0.05 to 0.15 T (500 to 1500 G), y is preferably in the range of 0.05 to 0.20.

What is claimed is:

1. A garnet ferrite having a composition expressed by the formula:

$A_3Fe_{5-5y}X_{5y}O_{12}$, where Fe is in an amount 0.5% to 5% lower than a value derived from stoichiometry; A represents Y or Y and Gd; and X represents at least one element selected from the group consisting of Al, In, and Mn, and y has a value ranging from 0.05 to 0.20.

2. A garnet ferrite according to claim 1, wherein the composition thereof is expressed by the formula:

$$Y_xGd_{3-x}Al_{5y}O_{12},$$

where X is 0 or more, and less than 3.

3. A garnet ferrite according to claim 1, wherein the composition thereof is expressed by the formula:

$$Y_xFe_{5-5y}Al_{5y}O_{12},$$

where y has a value ranging from 0.05 to 0.20.

4. A garnet ferrite according to claim 1, wherein part of the Fe is replaced with Mn in an amount equivalent to at most 0.1% by weight of MnO.

5. A method for preparing a garnet ferrite having a composition expressed by the formula:

$$A_3B_5O_{12},$$

where A represents Y or Y and Gd; and B represents Fe and at least one element selected from the group consisting of Al, In, and Mn, containing Fe in an amount 0.5% to 5% lower than a value derived from stoichiometry, the method comprising the steps of:

weighing powdered raw materials so that only the Fe content is reduced in an amount 0.5% to 5% lower than the stoichiometric value;

mixing the powdered raw materials having a desired composition;

calcining the raw materials to form a calcined material;

pulverizing and mixing the calcined material; and subjecting the calcined material to forming and firing, wherein, the step of mixing the raw materials and the step of pulverizing and mixing the calcined material are performed using a pulverizer whose portion coming into contact with the raw materials or the calcined material does not contain Fe.

6. A method for preparing the garnet ferrite according to claim 5, wherein the pulverizer is a ball mill or a planetary mill whose portion coming into contact with the raw materials does not contain Fe.

7. A non-reciprocal circuit device comprising:

a magnetic assembly having a garnet ferrite expressed by the formula:

$$A_3Fe_{5-5y}X_{5y}O_{12},$$

containing Fe in an amount 0.5% to 5% lower than a value derived from stoichiometry, where A represents Y or Y and Gd and X represents at least one element selected from the group consisting of Al, In, and Mn and y has a value ranging from 0.05 to 0.20, and a plurality of center conductors disposed on an upper surface of a main body, the center conductors intersecting each other at a predetermined angle with electrical insulation;

a magnet for applying a direct current magnetic field to the magnetic assembly;

a matching capacitor; and a yoke for joining the magnetic assembly, the magnet, and the matching capacitor together.

* * * * *